(12) United States Patent
Fukushima et al.

(10) Patent No.: US 11,136,988 B2
(45) Date of Patent: Oct. 5, 2021

(54) GAS DYNAMIC BEARING, MOTOR, AND BLOWER APPARATUS

(71) Applicant: Nidec Corporation, Kyoto (JP)

(72) Inventors: Kazuhiko Fukushima, Kyoto (JP); Takehito Tamaoka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/787,276

(22) Filed: Feb. 11, 2020

(65) Prior Publication Data

US 2020/0309140 A1  Oct. 1, 2020

(30) Foreign Application Priority Data

Mar. 29, 2019 (JP) .............................. JP2019-066218

(51) Int. Cl.
*F16C 32/06* (2006.01)
*F04D 25/06* (2006.01)
(Continued)

(52) U.S. Cl.
CPC ........ *F04D 25/062* (2013.01); *F16C 32/0607* (2013.01); *F16C 32/0614* (2013.01);
(Continued)

(58) Field of Classification Search
CPC .............. F16C 32/0607; F16C 33/0614; F16C 32/0651; F16C 33/1005; F16C 33/1015;
(Continued)

(56) References Cited

U.S. PATENT DOCUMENTS

| 6,722,785 B1 * | 4/2004 | Ikeo | F16C 33/043 384/112 |
| 7,510,329 B2 * | 3/2009 | Shishido | F16C 17/026 384/100 |

(Continued)

FOREIGN PATENT DOCUMENTS

| CN | 104426285 A | 3/2015 | |
| CN | 104514585 A * | 4/2015 | ........... F01D 25/162 |

(Continued)

OTHER PUBLICATIONS

Official Communication issued in corresponding Chinese Patent Application No. 202010090282.4, dated Jun. 10, 2021.

*Primary Examiner* — Marcus Charles
(74) *Attorney, Agent, or Firm* — Keating & Bennett, LLP

(57) ABSTRACT

A gas dynamic bearing includes a shaft extending along a central axis extending vertically, and a sleeve with a hole opening at least at one end of the sleeve in an axial direction, at least a portion of the shaft housed inside the hole. The sleeve includes dynamic pressure grooves in an inner peripheral surface of the hole. The shaft includes a core portion, and a protective portion that is disposed on an outer peripheral surface of the core portion and that includes at least a portion facing the inner peripheral surface of the hole in a radial direction. The protective portion includes a first protective portion and a second protective portion. The first protective portion is at least above or below the second protective portion in the axial direction, and includes at least a portion with a thickness in the radial direction more than a thickness of the second protective portion in the radial direction.

19 Claims, 13 Drawing Sheets

(51) Int. Cl.
  *F04D 29/05* (2006.01)
  *F04D 19/00* (2006.01)
  *F04D 29/056* (2006.01)

(52) U.S. Cl.
  CPC ........ *F16C 32/0651* (2013.01); *F04D 19/002* (2013.01); *F04D 29/056* (2013.01); *F05B 2240/50* (2013.01); *F16C 2360/46* (2013.01)

(58) Field of Classification Search
  CPC .. F16C 2360/46; F04D 25/062; F04D 19/002; F04D 29/056; F05B 2240/50
  USPC ....... 384/100, 107, 109, 115, 119, 130, 290; 310/90
  See application file for complete search history.

(56) References Cited

U.S. PATENT DOCUMENTS

| | | | |
|---|---|---|---|
| 2002/0164096 A1 | 11/2002 | Kashiwada et al. | |
| 2003/0012465 A1* | 1/2003 | Nakamura | F16C 17/107 384/100 |
| 2004/0107577 A1* | 6/2004 | Hayashi | F16C 33/107 29/898.02 |
| 2005/0147336 A1* | 7/2005 | Shishido | F16C 33/103 384/107 |
| 2008/0267545 A1* | 10/2008 | Shih | F16C 33/1075 384/117 |
| 2013/0119801 A1* | 5/2013 | Smirnov | H02K 5/1675 310/90 |
| 2014/0186199 A1* | 7/2014 | Jung | F04D 25/08 417/365 |
| 2015/0055246 A1 | 2/2015 | Sumiji | |

FOREIGN PATENT DOCUMENTS

| | | | | |
|---|---|---|---|---|
| CN | 111365284 A | * | 7/2020 | ............. F04D 29/12 |
| DE | 102018201613 A1 | * | 9/2018 | ............. H02K 15/14 |
| JP | 2000-304037 A | | 10/2000 | |
| JP | 2006142421 A | * | 6/2006 | ............. F16C 17/02 |
| JP | 2011033103 A | * | 2/2011 | ............. F16C 33/20 |
| JP | 5717953 B2 | * | 5/2015 | ........ G11B 19/2036 |
| JP | 6340798 B2 | * | 6/2018 | ........... F04D 29/281 |
| KR | 20140119673 A | * | 10/2014 | ........... F04D 29/002 |
| RU | 143279 U1 | * | 7/2014 | ................ F02C 3/04 |

* cited by examiner

GAS DYNAMIC BEARING, MOTOR, AND BLOWER APPARATUS

CROSS REFERENCE TO RELATED APPLICATION

The present invention claims priority under 35 U.S.C. § 119 to Japanese Application No. 2019-066218 filed on Mar. 29, 2019, the entire contents of which are hereby incorporated herein by reference.

FIELD OF THE INVENTION

The present disclosure relates to a gas dynamic bearing, and a motor and a blower apparatus using the gas dynamic bearing.

BACKGROUND

A conventional gas dynamic bearing includes a ring having an outer peripheral surface region in a cylindrical shape, and a housing having a tubular portion having an inner peripheral surface region facing the outer peripheral surface region. The outer peripheral surface region or the inner peripheral surface region is provided with a plurality of radial dynamic pressure grooves that allows a space between both the surface regions to act as a radial dynamic bearing region.

The gas dynamic bearing includes the radial dynamic bearing region in which air is compressed, for example. Thus, the gas dynamic bearing operates in a non-contact manner, so that it is available at high rotational speeds and has high noise reduction.

Unfortunately, the conventional gas dynamic bearing may cause the ring and the housing to come into direct contact with each other when a rotor has an extremely slow rotational speed or is stopped. For example, repeating rotation and stopping causes the ring to rotate in a state where the ring and the housing are in contact with each other, so that at least one of the ring and the housing may be scraped to cause unstable rotation.

SUMMARY

An example embodiment of a gas dynamic bearing of the present disclosure includes a shaft disposed along a central axis extending vertically, and a sleeve provided with a hole opening at least at one end of the sleeve in an axial direction, at least a portion of the shaft being housed inside the hole. The sleeve includes a plurality of dynamic pressure grooves in an inner peripheral surface of the hole. The shaft includes a core portion, and a protective portion that is disposed on an outer peripheral surface of the core portion and that includes at least a portion facing the inner peripheral surface of the hole in a radial direction. The protective portion includes a first protective portion and a second protective portion. The first protective portion is disposed at least above or below the second protective portion in the axial direction, and includes at least a portion having a thickness in the radial direction more than a thickness of the second protective portion in the radial direction.

The above and other elements, features, steps, characteristics and advantages of the present disclosure will become more apparent from the following detailed description of the example embodiments with reference to the attached drawings.

DETAILED DESCRIPTION

Figure 1:
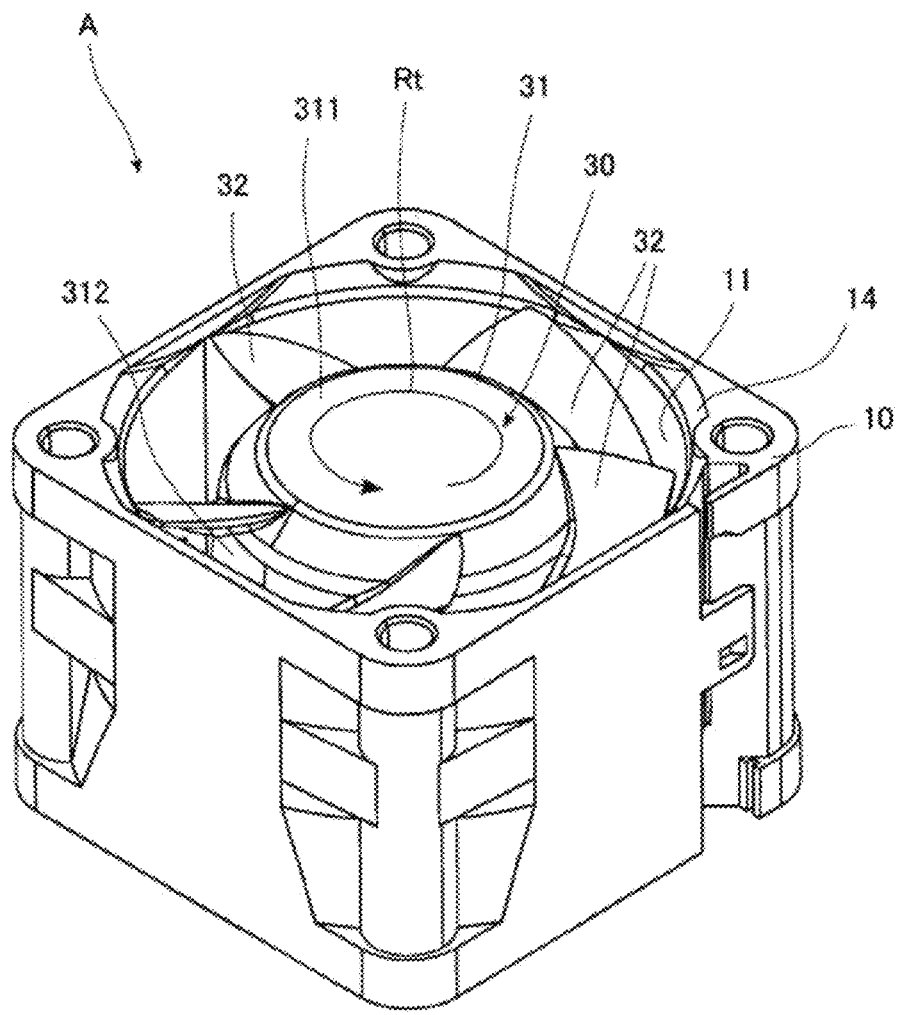
FIG. 1 is a perspective view of a blower apparatus.

Hereinafter, example embodiments of the present disclosure will be described in detail with reference to the drawings. In the present specification, a blower apparatus A, a motor 20, and a gas dynamic bearing 5 have the same central axis Cx. In the present specification, a direction parallel to the central axis Cx of the blower apparatus A, the motor 20, and the gas dynamic bearing 5 is referred to as an "axial direction", a direction perpendicular to the central axis Cx is referred to as a "radial direction", and a direction along an arc about the central axis Cx is referred to as a "circumferential direction". In the present specification, a shape and a positional relationship of each part of the blower apparatus A will be described in which the axial direction is defined as a vertical direction and a direction from an impeller 30 toward an intake port 14 of the housing 10 is defined as an upward direction. The vertical direction is a name that is simply used for the sake of explanation, and does not limit a positional relationship and a direction of the blower apparatus A when in use.

Figure 2:
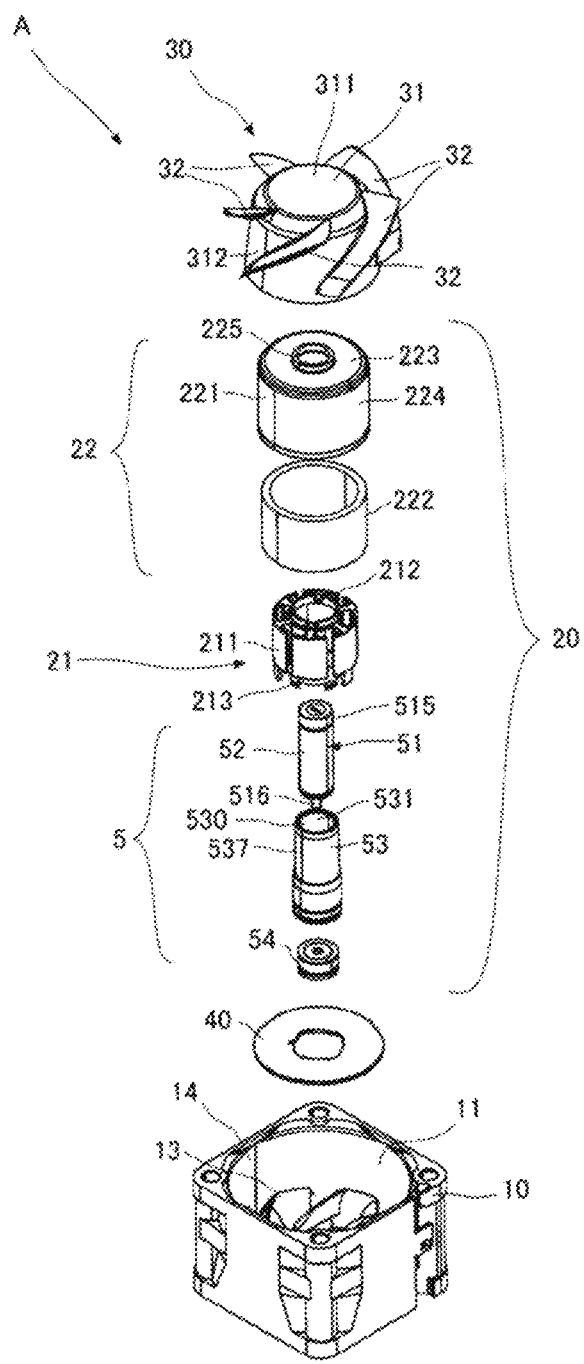
FIG. 2 is an exploded perspective view of the blower apparatus illustrated in FIG. 1.
Figure 3:
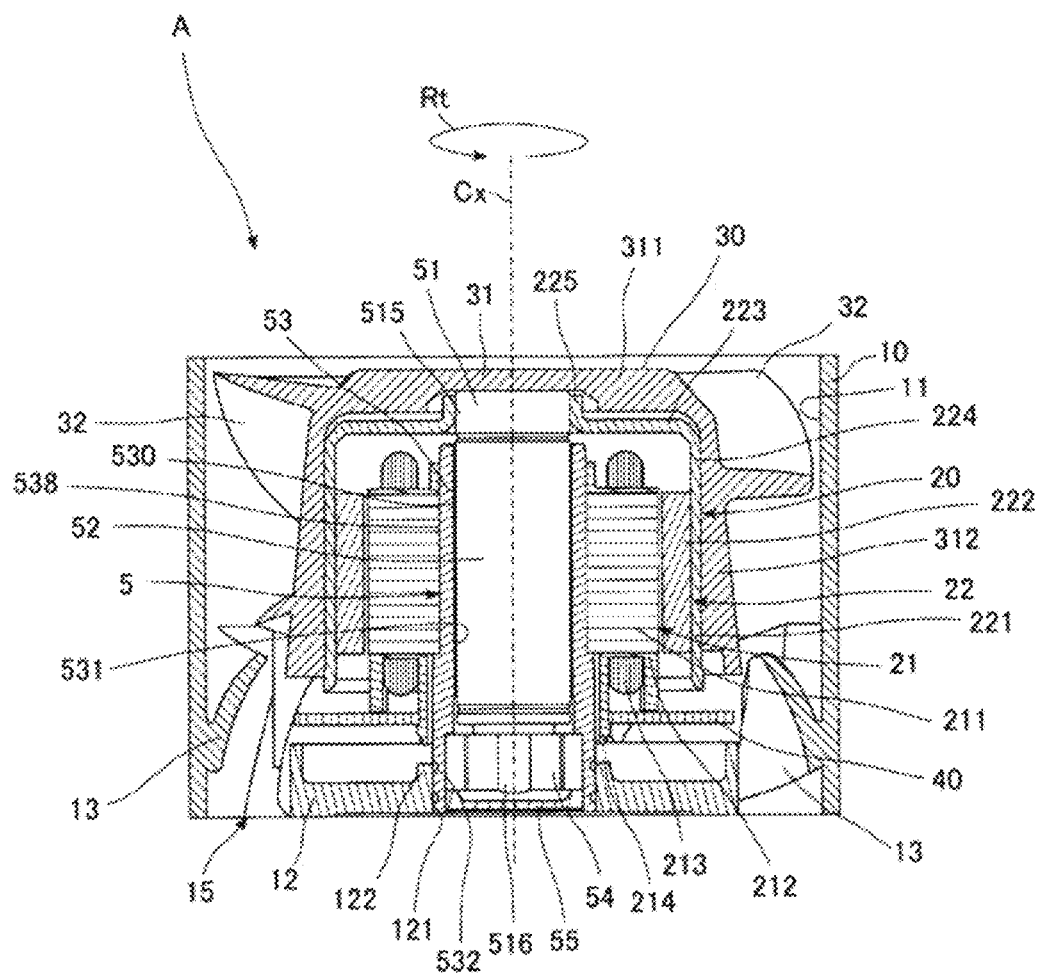
FIG. 3 is a longitudinal sectional view of the blower apparatus illustrated in FIG. 1.

Hereinafter, a blower apparatus according to an example embodiment of the present disclosure will be described. FIG. 1 is a perspective view of a blower apparatus A. FIG. 2 is an exploded perspective view of the blower apparatus A illustrated in FIG. 1. FIG. 3 is a longitudinal sectional view of the blower apparatus A illustrated in FIG. 1. As illustrated in FIGS. 1 to 3, the blower apparatus A includes a housing 10, a motor 20, an impeller 30, and a circuit board 40.

As illustrated in FIG. 3, the blower apparatus A includes the motor 20, the impeller 30, and the circuit board 40 that are disposed inside the housing 10. The impeller 30 is attached to the motor 20. The impeller 30 is rotated by rotation of the motor 20. The motor 20 with the impeller 30 attached is attached inside a wind-tunnel portion 11 described below of the housing 10. The blower apparatus A operates such that the motor 20 rotates to generate an airflow in the wind-tunnel portion 11 from upward to downward in the axial direction. The airflow is ejected from an exhaust port 15 described below.

As illustrated in FIGS. 1 to 3, the housing 10 has a wind-tunnel portion 11, a base portion 12, and a stator vane 13. The wind-tunnel portion 11 is a through-hole that connects an upper end and a lower end of the housing 10. The wind-tunnel portion 11 has a cylindrical inner surface extending along the central axis Cx. The impeller 30 is disposed inside the wind-tunnel portion 11. The impeller 30 is rotated inside the wind-tunnel portion 11 to generate an airflow from upward to downward inside the wind-tunnel portion 11. The wind-tunnel portion 11 is a guide for guiding the airflow generated by the rotation of the impeller 30 along the central axis Cx. The wind-tunnel portion 11 has an upper end in the axial direction, serving as the intake port 14, and a lower end in the axial direction, serving as the exhaust port 15. As the impeller 30 is rotated, air is sucked in from the intake port 14, and an airflow accelerated or pressurized by the impeller 30 is discharged from the exhaust port 15.

The base portion 12 is disposed at the lower end of the wind-tunnel portion 11 in the axial direction, i.e., at a downstream end of the wind-tunnel portion 11 in a flow direction of the airflow. The base portion 12 is then disposed inside the wind-tunnel portion 11 in the radial direction. The base portion includes a base through hole 121 passing through the base portion 12 in the axial direction in its central portion (refer to FIG. 3), and a bearing holder 122 in a tubular shape protruding upward from a peripheral portion of the base through hole 121 in the axial direction. While the bearing holder 122 is formed of the same member as the base portion 12, it is not limited thereto. For example, the bearing holder 122 may be fixed to the base portion 12 by a fixing method such as welding, bonding, or screwing.

The wind-tunnel portion 11 and the base portion 12 are disposed with a gap in the radial direction. In the gap between the wind-tunnel portion 11 and the base portion 12, a plurality of stator vanes 13 is disposed in the circumferential direction. The stator vanes 13 connect the wind-tunnel portion 11 and the base portion 12. In other words, the base portion 12 is held in the wind-tunnel portion 11 with the stator vanes 13. The stator vanes 13 rectify the airflow generated by the rotation of the impeller 30 into an axially symmetric flow about the central axis Cx. For this purpose, the plurality of stator vanes 13 are disposed at equal intervals in the circumferential direction. The base portion 12 is formed integrally with the housing 10. Here, the housing 10 and the base portion 12 are formed by injection molding of a resin. However, the present disclosure is not limited to this, and the base portion 12 may be formed as a separate member from the housing 10.

As described above, the impeller 30 is rotatably disposed inside the wind-tunnel portion 11 of the housing 10 while being attached to the motor 20. The impeller 30 is attached to a rotor 22 described below of the motor 20. The impeller 30 is rotated about the central axis by rotation of the motor 20. As illustrated in FIGS. 1 to 3, the impeller 30 includes an impeller hub 31 and a plurality of blades 32. The impeller 30 is formed by injection molding of a resin.

As illustrated in FIGS. 2 and 3, the impeller hub 31 includes a hub top plate portion 311 and a hub tubular portion 312. The hub top plate portion 311 has a disk-like shape, expanding in the radial direction. The hub tubular portion 312 has a tubular shape extending axially downward from a radially outer edge of the hub top plate portion 311.

Inside the hub tubular portion 312, a rotor yoke 221 of the rotor 22 described below of the motor 20 is fixed. Accordingly, the impeller hub 31 and the rotor 22 are fixed.

The plurality of blades 32 are disposed side by side on an outer surface of the impeller hub 31 in the circumferential direction. In the present example embodiment, the blades 32 are disposed at predetermined intervals in the circumferential direction on the outer surface of the impeller hub 31, and are integrally formed with the impeller hub 31. The blade 32 has an upper portion disposed forward of its lower portion in a rotation direction Rt.

The impeller 30 is attached inside the wind-tunnel portion 11 of the housing 10 while being fixed to the motor 20. When the motor 20 is driven, the impeller 30 is rotated about the central axis Cx inside the wind-tunnel portion 11.

The circuit board 40 is disposed inside the housing 10. The circuit board 40 is disposed below the motor 20 in the axial direction. The circuit board 40 has a disk-like shape with a through hole at its center. The circuit board 40 includes a drive circuit for driving the motor 20. The circuit board 40 is held by a board holder 214 formed on an insulator 212 of a stator 21 described below of the motor 20.

Next, details of the motor 20 will be described. As illustrated in FIGS. 2 and 3, the motor 20 includes the stator 21, the rotor 22, and the gas dynamic bearing 5. The stator 21 and the rotor 22 are attached to the base portion 12 of the housing 10 using the gas dynamic bearing 5.

Figure 4:
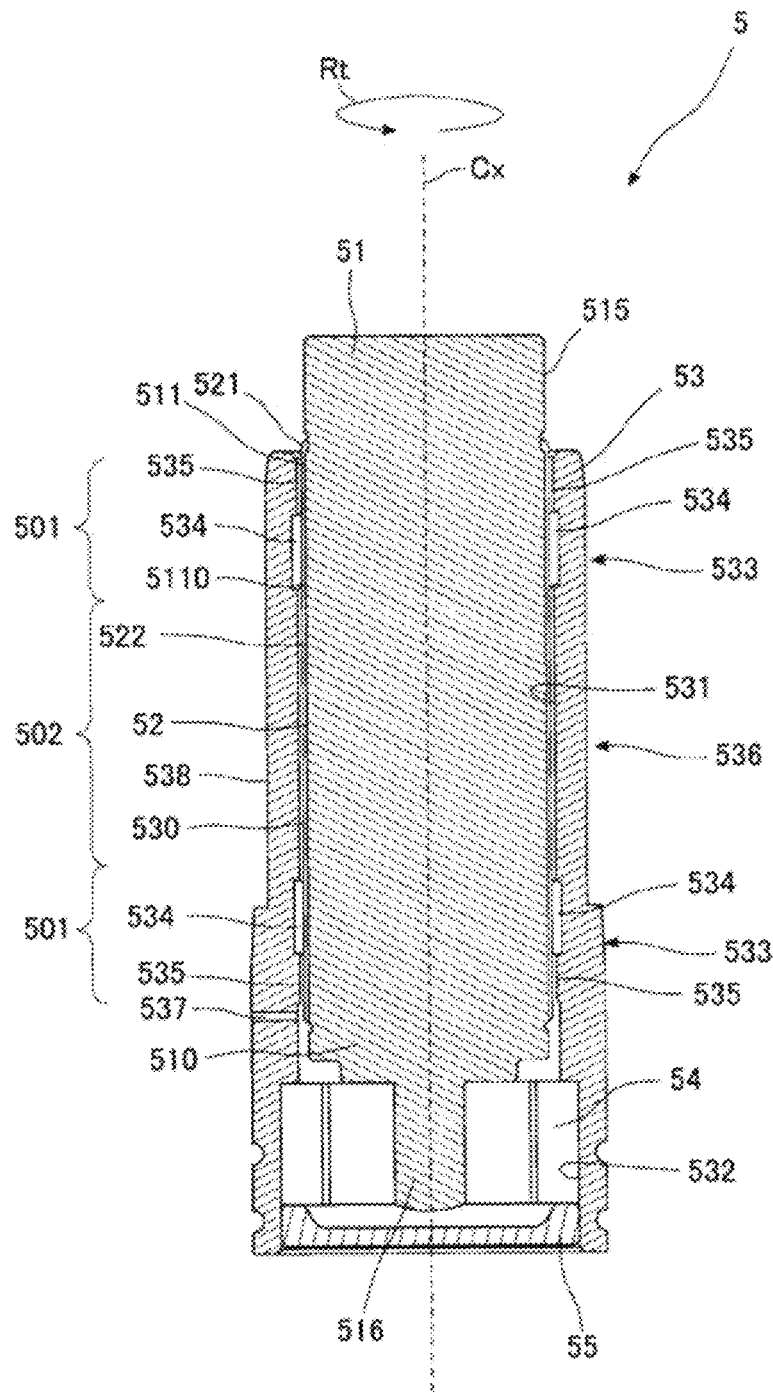
FIG. 4 is a longitudinal sectional view of a shaft and a sleeve, defining a gas dynamic bearing 5.
Figure 5:
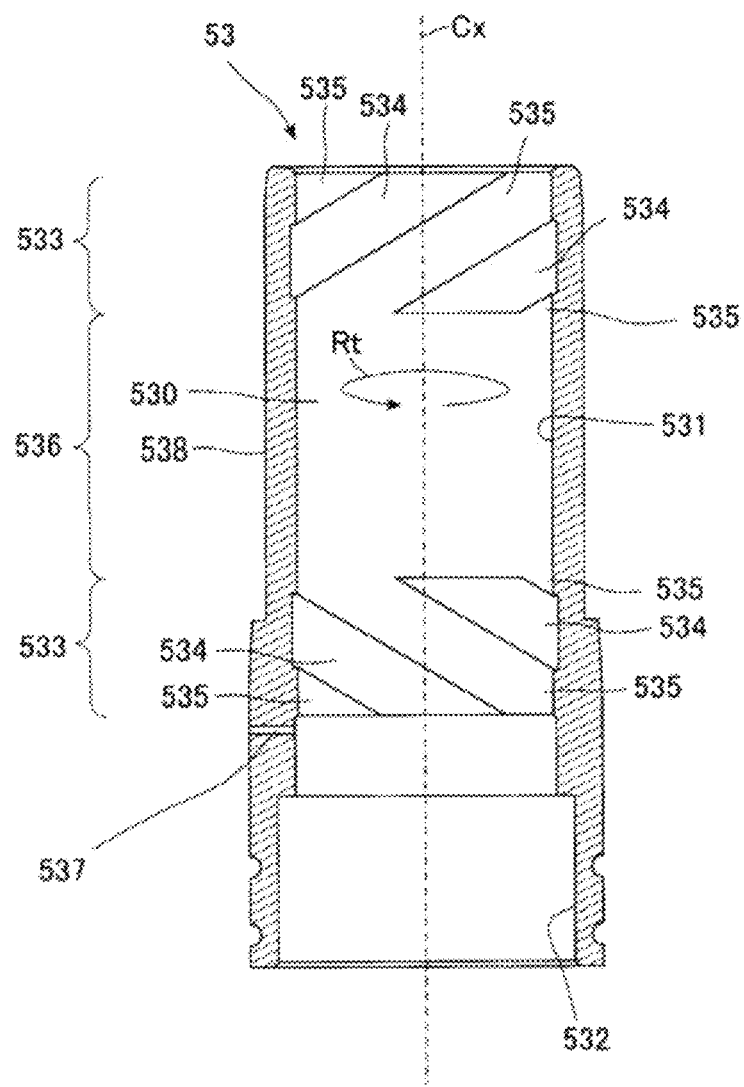
FIG. 5 is a longitudinal sectional view of a sleeve.
Figure 6:
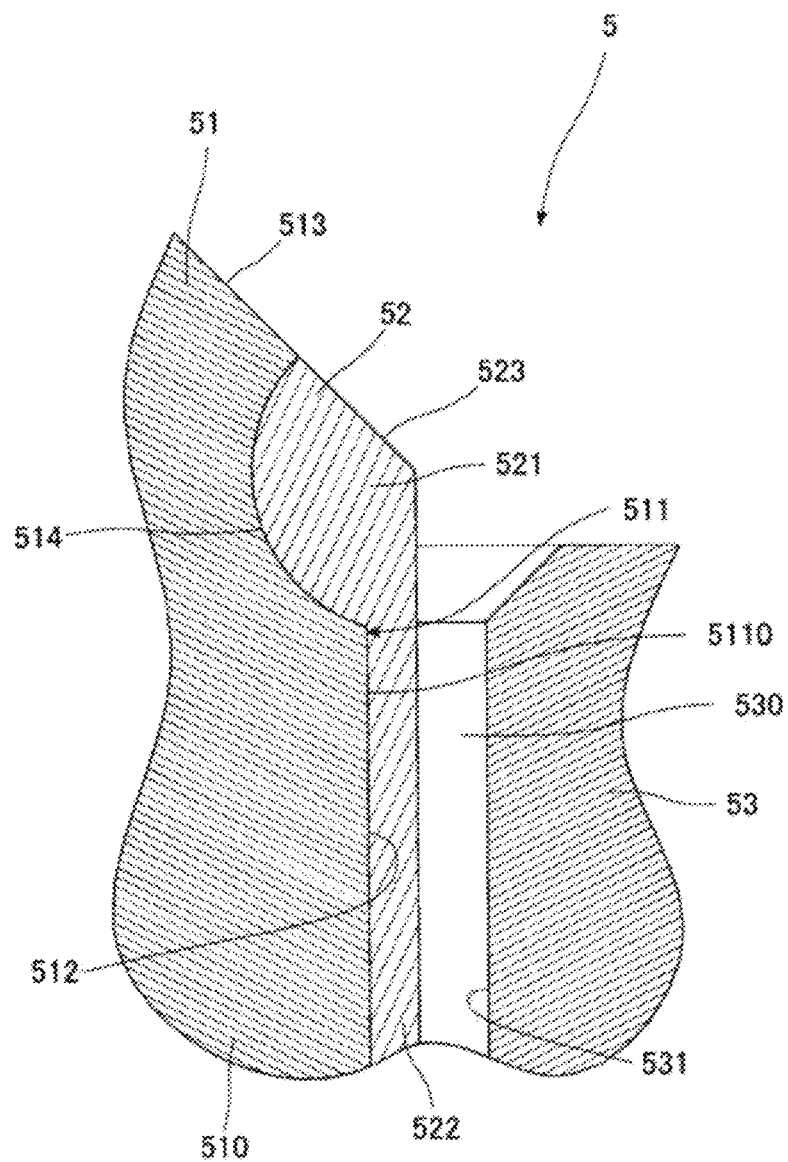
FIG. 6 is an enlarged cross-sectional view in which a first protective portion of a gas dynamic bearing according to an example embodiment of the present disclosure is enlarged.

FIG. 4 is a longitudinal sectional view of a shaft 51 and a sleeve 53, constituting the gas dynamic bearing 5. FIG. 5 is a longitudinal sectional view of the sleeve 53. FIG. 6 is an enlarged cross-sectional view in which a first protective portion 521 of the shaft 51 is enlarged. FIG. 6 also illustrates a part of the sleeve 53. An enlarged view of the first protective portion used in the following description also illustrates a part of the sleeve.

As illustrated in FIGS. 2 to 4, the gas dynamic bearing 5 includes the shaft 51, the sleeve 53, a thrust magnet 54, and a thrust plate 55. As illustrated in FIGS. 3 and 4, the shaft 51 is rotatably disposed inside the sleeve 53. That is, the shaft 51 is disposed along the central axis Cx extending in the vertical direction. The thrust magnet 54 is attached to the shaft 51 and the sleeve 53. The thrust magnet 54 allows the shaft 51 to be rotatable to the sleeve 53 and to be supported at a predetermined position in the axial direction (thrust direction). The thrust plate 55 closes a lower end opening of the sleeve 53.

The shaft 51 and the sleeve 53 face each other in the radial direction with a gap therebetween. The shaft 51 and the sleeve 53 face each other in the radial direction in a portion divided into two dynamic pressure generating portions 501 and a dynamic pressure holding portion 502 in the axial direction. The two dynamic pressure generating portions 501 are regions with an upper end portion and a lower end portion in the axial direction in the gap between the shaft 51 and the sleeve 53 in the radial direction. The dynamic pressure holding portion 502 is a region between the two dynamic pressure generating portions 501 in the gap between the shaft 51 and the sleeve 53 in the radial direction.

The dynamic pressure holding portion 502 is disposed between the dynamic pressure generating portions 501 in the axial direction while being continuous with the respective dynamic pressure generating portions 501. The dynamic pressure generating portion 501 of the sleeve 53 is formed with a gas compressing portion 533 described below. Then, as the shaft 51 is rotated, the dynamic pressure generating portion 501 generates an airflow toward the center in the axial direction, i.e., toward the dynamic pressure holding portion 502. This increases atmospheric pressure in the dynamic pressure holding portion 502. As described in detail later, the gas dynamic bearing 5 supports the shaft 51 in a non-contact manner with the sleeve 53 using the dynamic pressure holding portion 502 by increasing the atmospheric pressure in the dynamic pressure holding portion 502. Hereinafter, details of each part of the gas dynamic bearing 5 will be described.

First, the sleeve 53 will be described. As illustrated in FIGS. 4 and 5, the sleeve 53 has a tubular shape extending along the central axis Cx. The sleeve 53 is made of metal such as stainless steel, for example. As long as the sleeve 53 has sufficient strength, ceramic or the like may be used, for example. The material forming the sleeve 53 is not limited to stainless steel, ceramic, or the like, and a material available for firmly holding the shaft 51 and a stator core 211 can be widely used.

The sleeve 53 includes a hole 530 extending along the central axis Cx. The hole 530 opens at both ends of the sleeve 53 in the axial direction. Inside the hole 530, the shaft 51 is rotatably disposed. That is, the sleeve 53 includes the hole 530 that opens at least at its one end in the axial direction, and accommodates at least a part of the shaft 51 inside the hole 530.

The hole 530 of the sleeve 53 is provided in a bearing magnet holder 532, the gas compressing portion 533, and an inner tubular portion 536. The bearing magnet holder 532 is disposed at a lower end of the hole 530 in the axial direction. The bearing magnet holder 532 holds a radially outer surface of the thrust magnet 54. The thrust plate 55 is attached in the lower end of the hole 530 of the sleeve 53. The thrust plate 55 is fixed in the hole 530 of the sleeve 53, and prevents foreign matter from entering the inside of the sleeve 53 from outside the sleeve 53.

As described above, the gas compressing portion 533 is formed in a portion constituting the dynamic pressure generating portion 501 in an inner peripheral surface 531 of the hole 530. The inner tubular portion 536 is formed in a portion constituting the dynamic pressure holding portion 502 in the inner peripheral surface 531 of the hole 530.

The inner tubular portion 536 is in a tubular shape having a constant inner diameter throughout its entire length in the axial direction. Here, the term "constant" includes not only accurately constant, but also a variation to such an extent that change in atmospheric pressure does not cause rotation of the shaft 51 to be unstable.

The gas compressing portion 533 is disposed with a plurality (e.g., three) of dynamic pressure grooves 534. That is, the sleeve 53 includes a plurality of dynamic pressure grooves 534 in the inner peripheral surface 531 of the hole 530. The dynamic pressure groove 534 is radially recessed from the inner peripheral surface 531 of the hole 530 and extends in the axial direction and the circumferential direction. The dynamic pressure groove 534 has a spiral shape in which its portion adjacent to the dynamic pressure holding portion 502 is located forward in a rotation direction of the shaft 51. The gas compressing portion 533 is disposed with three dynamic pressure grooves 534 side by side in the circumferential direction. Then, a land portion 535 is formed between the dynamic pressure grooves 534 adjacent to each other in the circumferential direction. The land portion 535 is a part of a cylindrical portion having an inner diameter equal to that of the inner tubular portion 536. Here, the term "equal" includes not only accurately equal, but also a variation to such an extent that change in atmospheric pressure does not cause rotation of the shaft 51 to be unstable. The gas compressing portion 533 and the dynamic pressure groove 534 are not limited to the above-described configuration, and can widely use a shape allowing gas to be fed to a central portion of the sleeve 53 in the axial direction by rotation of the shaft 51.

The sleeve 53 also includes a vent hole 537 and a stator fixing portion 538. The vent hole 537 is a through hole passing through the sleeve 53 from outside into the hole 530. In the present example embodiment, the vent hole 537 extends in the radial direction. The vent hole 537 is formed in a lower portion of the sleeve 53 in the axial direction. When an axially upward airflow is generated in the dynamic pressure generating portion 501 on a lower side by the rotation of the shaft 51, gas (air) flows into the hole 530 through the vent hole 537. Accordingly, the dynamic pressure generating portion 501 on the lower side can feed air to the dynamic pressure holding portion 502. The vent hole 537 is disposed at a position where the vent hole 537 is not closed by the stator 21 or the like.

The stator fixing portion 538 is formed in an outer surface of the sleeve 53. As illustrated in FIG. 3, the stator core 211 of the stator 21 is fixed to the stator fixing portion 538. Examples of a method of fixing the stator core 211 include press-fitting, for example. However, the method of fixing the stator core 211 is not limited to press-fitting, and a method of fixing the stator core 211 to the sleeve 53, such as bonding, welding, or screwing, can be widely employed.

The shaft 51 extends along the central axis Cx. The shaft 51 includes a core portion 510 and a protective portion 52. In the present example embodiment, the core portion 510 is a pillar member made of metal such as stainless steel. As long as the core portion 510 has sufficient strength, ceramic or the like may be used instead of metal, for example. In addition, as long as the core portion 510 has sufficient strength, a so-called tubular hollow member provided inside with a space may be used. Examples of the sufficient strength of the core portion 510 include strength that does not cause the core portion 510 to be easily deformed during rotation, for example.

As illustrated in FIG. 4, the core portion 510 includes a bearing portion 511, a rotor fixing portion 515, and a magnet fixing portion 516. The core portion 510 includes the rotor fixing portion 515, the bearing portion 511, and the magnet fixing portion 516, being disposed in this order from above in the axial direction. The rotor fixing portion 515 has a cylindrical columnar shape, and is fixed in a shaft holder 225 of the rotor yoke 221 described later of the rotor 22. The rotor fixing portion 515 is fixed in the shaft holder 225 by press fitting in the present example embodiment. However, a method of fixing the rotor fixing portion 515 in the shaft holder 225 is not limited to press fitting, and a method of allowing center lines of the shaft 51 and the rotor 22 to be not only aligned with each other, but also firmly fixed can be widely used. The magnet fixing portion 516 has a cylindrical columnar shape, and is fixed inside the thrust magnet 54.

The shaft 51 is supported in the axial direction (thrust direction) by the thrust magnet 54. The thrust magnet 54 is divided into a radially inner portion and a radially outer portion. The radially inner portion is fixed to the magnet fixing portion 516 of the shaft 51, and the radially outer portion is held by the bearing magnet holder 532 of the sleeve 53. The thrust magnet 54 maintains the shaft 51 at a predetermined axial position with respect to the sleeve 53 using attraction and repulsion of the magnet.

As illustrated in FIG. 6, an outer peripheral surface 5110 of the bearing portion 511 includes a cylindrical surface 512, an inclined surface 513, and a concave portion 514. The cylindrical surface 512 is in a cylindrical shape having a constant outer diameter. That is, the outer peripheral surface 5110 of the bearing portion 511 includes the cylindrical surface 512 in which the core portion 510 has an outer diameter constant in the axial direction. Here, the term "constant outer diameter" includes not only an accurately constant outer diameter, but also a variation to such an extent that change in atmospheric pressure does not cause rotation of the shaft 51 to be unstable.

The inclined surface 513 is disposed above the cylindrical surface 512 of the core portion 510, and inclines toward the central axis Cx as extending toward an end of the core portion 510. That is, the outer peripheral surface 5110 includes the inclined surface 513 that is disposed at least above or below the cylindrical surface 512 and that inclines toward the central axis Cx as extending toward the end of core portion 510.

Then, a cross section of a portion formed with the inclined surface 513 of the core portion 510, taken along a plane perpendicular to the central axis Cx, has a circular shape. The inclined surface 513 has a tapered shape, for example. The inclined surface 513 is not limited to the tapered shape, and may have a curved shape in a longitudinal section taken along a longitudinal plane including the central axis Cx. While in the present example embodiment, the inclined surface 513 is disposed above the cylindrical surface 512, it is not limited to this, and may be disposed below the cylindrical surface 512. In addition, while in the present example embodiment, the inclined surface 513 has a shape continuous in the circumferential direction, it is not limited to this. For example, the inclined surface 513 may be formed only in a part of an end portion of the bearing portion 511 in the circumferential direction.

As illustrated in FIG. 6, the concave portion 514 is recessed in the radial direction. That is, the concave portion 514 recessed in the radial direction is formed in the outer peripheral surface 5110. The concave portion 514 connects the cylindrical surface 512 and the inclined surface 513. That is, the concave portion 514 connects the cylindrical surface 512 and the inclined surface 513 in the axial direction. The concave portion 514 is continuous about the central axis Cx. The concave portion 514 has a portion with a distance to the central axis Cx less than a distance thereto from its axial ends. When the concave portion 514 includes the portion with the distance to the central axis Cx less than the distance thereto from its axial ends, the protective portion 52 can be easily formed. A procedure for forming the protective portion 52 will be described later.

The protective portion 52 is disposed in the bearing portion 511 of the core portion 510 of the shaft 51. The protective portion 52 is disposed radially outside the outer peripheral surface 5110 of the bearing portion 511 to cover the outer peripheral surface 5110 from radially outward. The protective portion 52 is made of a soft material, such as a material containing molybdenum disulfide, having a lower coefficient of friction than a material forming the core portion 510 and the sleeve 53, here, stainless steel.

The protective portion 52 includes a first protective portion 521 and a second protective portion 522. The second protective portion 522 is disposed radially outside the cylindrical surface 512 of the outer peripheral surface 5110. When the shaft 51 is disposed inside the sleeve 53, the protective portion 52 radially faces the inner peripheral surface 531 of the hole 530. That is, the protective portion 52 is disposed on the outer peripheral surface 5110 and at least partially faces the inner peripheral surface 531 of the hole 530 in the radial direction.

The second protective portion 522 is in a cylindrical shape, for example. The second protective portion 522 has an outer surface with a uniform outer diameter. Here, the term "uniform" includes not only completely uniform, but also a variation to such an extent that change in atmospheric pressure does not cause rotation of the shaft 51 to be unstable. The second protective portion 522 may not be in a tubular shape. For example, the second protective portion 522 may be intermittently disposed in the circumferential direction of the cylindrical surface 512 of the core portion 510, i.e., may be disposed at intervals in the circumferential direction. In any case, the placement is such that change in atmospheric pressure does not cause rotation of the shaft 51 to be unstable.

The first protective portion 521 is connected to an upper end of the second protective portion 522 in the axial direction. The first protective portion 521 may be connected to a lower end of the second protective portion 522 in the axial direction. That is, the first protective portion 521 is disposed at least above or below the second protective portion 522 in the axial direction. The first protective portion 521 is in an annular shape. The first protective portion 521 is disposed in the concave portion 514. The first protective portion 521 has a thickness in the radial direction more than a thickness of the second protective portion 522 in the radial direction. That is, at least a part of the first protective portion 521 has a thickness in the radial direction more than a thickness of the second protective portion 522 in the radial direction.

When the first protective portion 521 is disposed in the concave portion 514, a contact area between the first protective portion 521 and the concave portion 514 can be increased. This causes the first protective portion 521 to be less likely to peel off from the concave portion 514. That is, when the first protective portion 521 is disposed in the concave portion 514, the protective portion 52 is firmly fixed to the core portion 510.

In the core portion 510 of the shaft 51, the concave portion 514 is adjacent to the inclined surface 513. Accordingly, the first protective portion 521 has a radially outer surface formed with a protective inclined surface 523 that smoothly continues to the inclined surface 513. Here, a state where the inclined surface 513 is smoothly connected to the protective inclined surface 523 includes a shape in which the inclined surface 513 and the protective inclined surface 523 have equal inclination.

The state above further includes a state where the inclined surface 513 and the protective inclined surface 523 continue on a boundary in a longitudinal section including the central axis Cx in a differentiable manner. The first protective portion 521 includes the protective inclined surface 523 continuous with the inclined surface 513, and is differentiable on the boundary between the inclined surface 513 and the protective inclined surface 523 in the longitudinal section including the central axis Cx. That is, the first protective portion includes a protective inclined surface continuous with the inclined surface, and the protective inclined surface is smoothly connected to the inclined surface (claim 4). The protective inclined surface 523 is connected on its side opposite to the inclined surface 513 to the second protective portion 522. The second protective portion 522 has an outermost diameter that is equal to an outermost diameter of the first protective portion 521. That is, a distance between a portion of the first protective portion 521, farthest from the central axis Cx in the radial direction, and the central axis Cx, is equal to a distance between a portion of the second protective portion 522, farthest from the central axis Cx in the radial direction, and the central axis Cx.

A step is less likely to be formed at the boundary between the first protective portion 521 and the second protective portion 522, so that an airflow flowing along the outer peripheral surface 5110 of the shaft 51 is less likely to be turbulent when flowing from an outer surface of the first protective portion 521 to an outer surface of the second protective portion 522. Accordingly, variation in gas pressure in the dynamic pressure holding portion 502 is suppressed, so that the shaft 51 can be rotated stably.

The first protective portion 521 may partly have a gap in the circumferential direction. As described later, the first protective portion 521 comes into contact with the inner peripheral surface 531 of the sleeve 53 when the shaft 51 inclines with respect to the central axis Cx. The gap in the first protective portions 521 is at a level causing the core portion 510 of the shaft 51 to have no contact with the inner peripheral surface 531 of the sleeve 53.

That is, at least one of the first protective portion 521 and the second protective portion 522 may have a gap in the circumferential direction. When at least one of the first protective portion 521 and the second protective portion 522 has a gap in the circumferential direction, a distance from the central axis Cx to a portion of the first protective portion 521, farthest in the radial direction may be equal to a distance from the central axis Cx to a portion of the second protective portion 522, farthest in the radial direction. This enables the first protective portion 521 and the second protective portion 522 to have farthest portions from the shaft 51 in the radial direction, each having an equal distance from the shaft 51, so that variation in dynamic pressure therein can be suppressed.

In addition, when at least one of the first protective portion 521 and the second protective portion 522 has a gap in the circumferential direction, material forming the protective portion 52 can be reduced in amount. Reducing the material forming the protective portion 52 in amount enables reduction in costs required for manufacturing. Reducing the material forming the protective portion 52 in amount also enables reduction in weight of the shaft 51, so that energy saving can be achieved.

As illustrated in FIG. 3, the stator 21 includes the stator core 211, the insulator 212, and a coil 213.

The stator core 211 includes a core back portion (not illustrated) in a tubular shape and a tooth portion (not illustrated) projecting radially outward from an outer peripheral surface of the core back portion. The stator core 211 may have a structure in which electromagnetic steel sheets are layered, or may be a single member formed by firing or casting powder. The stator core 211 includes the core back portion that is fixed to the stator fixing portion 538 of the sleeve 53.

The insulator 212 is a resin molding. The stator core 211 is partly covered with the insulator 212. The tooth portion is covered with the insulator 212, and the coil 213 is formed by winding a conductive wire around the tooth portion covered with the insulator 212. The insulator 212 insulates the stator core 211 from the coil 213. While in the present example embodiment, the insulator 212 is a resin molding, it is not limited to this. A configuration that can insulate the stator core 211 from the coil 213 can be widely used.

The insulator 212 includes the board holder 214. The board holder 214 extends downward from a lower surface of the insulator 212 in the axial direction. The board holder 214 passes through a through hole formed in a central portion of the circuit board 40 and holds the circuit board 40.

The sleeve 53 of the gas dynamic bearing 5 is held by the bearing holder 122 of the base portion 12. As described above, the stator core 211 is fixed to the sleeve 53, so that the stator core 211 is fixed to the base portion 12 with the sleeve 53 of the gas dynamic bearing 5. That is, the stator 21 is attached to the sleeve 53 of the gas dynamic bearing 5 and fixed to the housing 10. When the stator 21 is fixed to the housing 10, the center of the stator core 211 aligns with the central axis Cx (refer to FIG. 3).

As illustrated in FIGS. 2 and 3, the rotor 22 includes the rotor yoke 221 and a rotor magnet 222. The rotor yoke 221 includes a rotor top plate portion 223, a rotor tubular portion 224, and a shaft holder 225. The rotor yoke 221 is made of a magnetic metal. The rotor yoke 221 is formed by extruding a metal plate, for example. A method of forming the rotor yoke 221 is not limited to extrusion of a metal plate.

The rotor top plate portion 223 is in an annular shape and is provided in its central portion with a through hole. The rotor tubular portion 224 extends axially downward from a radially outer edge of the rotor top plate portion 223. The rotor tubular portion 224 is in a cylindrical shape. The shaft holder 225 is in a tubular shape projecting axially upward from a peripheral portion of the through hole. While the shaft holder 225 is formed on a side opposite of the rotor tubular portion 224 across the rotor top plate portion 223 in the axial direction, it is not limited to this, and may be formed on the same side.

The shaft 51 passes through the through hole formed in the central portion of the rotor top plate portion 223. Then, the shaft holder 225 holds the rotor fixing portion 515 of the shaft 51 at its upper end in the axial direction. The shaft holder 225 and the rotor fixing portion 515 are fixed by press fitting. Accordingly, the center of the rotor yoke 221 aligns with the central axis Cx. Fixing between the shaft holder 225 and the rotor fixing portion 515 is not limited to press-fitting, and a method enabling firm fixing, such as bonding or welding, can be widely used.

The rotor magnet 222 is in a cylindrical columnar shape. The rotor magnet 222 faces the stator 21 in the radial direction. The rotor magnet 222 has a structure in which N poles and S poles are alternately disposed in the circumferential direction. The rotor magnet 222 may be formed using a magnet that can be divided in the circumferential direction, or may be formed by alternately forming different magnetic poles in tubular bodies each formed of a single member in the circumferential direction.

The rotor magnet 222 is fixed to an inner surface of the rotor yoke 221. The rotor yoke 221 to which the rotor magnet 222 is fixed is fixed to the rotor fixing portion 515 of the shaft 51. Then, the shaft 51 is rotatably supported by the sleeve 53, so that the rotor magnet 222 faces the stator core 211 in the radial direction. When an electric current is applied to the coil 213, a magnetic force (attraction and repulsion) generated between the stator core 211 and the rotor magnet 222 causes a force in a rotation direction to act on the rotor 22.

The blower apparatus A and the motor 20 have the configurations described above. That is, the motor 20 includes the gas dynamic bearing 5, the stator 21 disposed on the outer surface of the sleeve 53, and the rotor 22 fixed to the upper end of the shaft 51 while radially facing the stator 21. The first protective portion 521 is disposed at an upper end of the bearing portion 511 in the axial direction. The blower apparatus A includes the motor 20 and the impeller 30 attached to the rotor 22.

Figure 7:
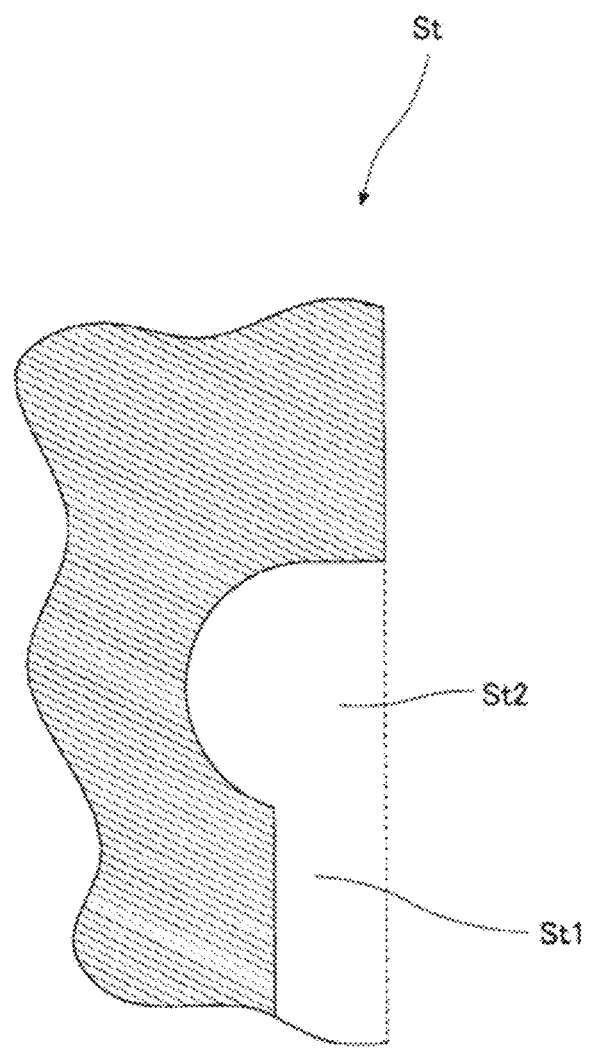
FIG. 7 is an enlarged cross-sectional view illustrating a state where a surface of a bar before manufacturing a shaft is cut.
Figure 8:
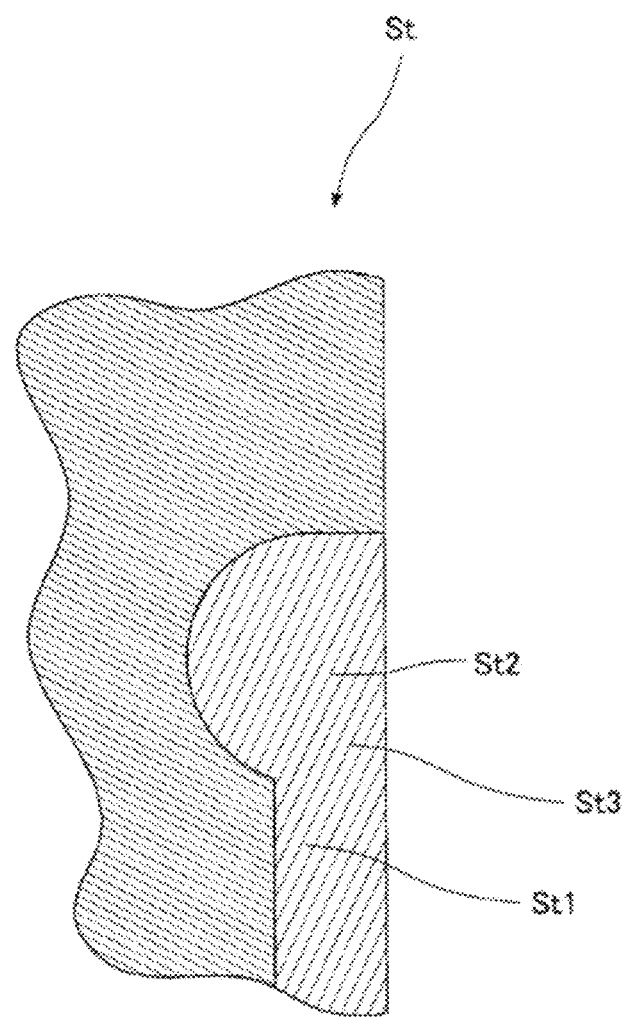
FIG. 8 is an enlarged cross-sectional view illustrating a state where a protective member is applied to a cut portion formed in FIG. 7.
Figure 9:
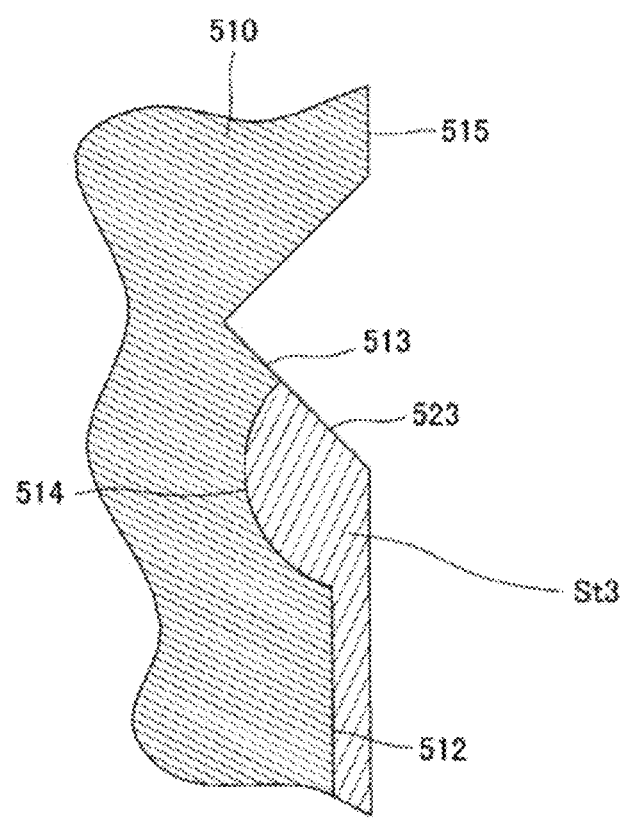
FIG. 9 is an enlarged cross-sectional view illustrating a state where the bar illustrated in FIG. 8 is formed by cutting processing.

Next, a manufacturing process of the shaft 51 will be described. FIG. 7 is an enlarged cross-sectional view illustrating a state where a surface of a bar St before manufacturing the shaft 51 is cut. FIG. 8 is an enlarged cross-sectional view illustrating a state where a protective member is applied to a cut portion formed in FIG. 7. FIG. 9 is an enlarged cross-sectional view illustrating a state where the bar St illustrated in FIG. 8 is formed by cutting processing. The manufacturing process described here is an example of the manufacturing process of the shaft 51, and may be formed by another process.

The shaft 51 is manufactured by processing the bar St in a cylindrical columnar shape. As illustrated in FIG. 7, an outer surface of the bar St is cut by lathe processing. An axially central portion of the bar St is cut by the lathe processing to form a first cut portion St1. Then, a second cut portion St2 in a recessed-groove shape is formed at an axial end (here, an upper end) of the first cut portion St1. The second cut portion St2 continuously extends in the circumferential direction. The concave portion 514 of the shaft 51 is formed of a part of the second cut portion St2.

Then, a protective member St3 is applied to the first cut portion St1 and the second cut portion St2. The protective member St3 is made of a material that forms the protective portion 52 after firing. That is, the material contains molybdenum. The protective member St3 has viscosity, for example, and contains the amount of molybdenum disulfide, enabling a coefficient of friction of the protective member St3 after sintering to be lower than that of each of the shaft 51 and the sleeve 53. Then, the protective member St3 is sintered while filling the first cut portion St1 and the second cut portion St2 (refer to FIG. 8).

The outer surface of the bar St on which the protective member St3 is formed is cut by lathe processing. The rotor fixing portion 515 and the magnet fixing portion 516 are formed at an upper end and a lower end of the bar St, respectively, by lathe processing. Then, the second cut portion St2 of the protective member St3 and a portion of the bar St, disposed on the second cut portion St2, are cut to form the inclined surface 513 and the protective inclined surface 523 having respective ends inclined toward the central axis Cx. When the inclined surface 513 and the protective inclined surface 523 are formed, a portion where the protective member St3 is not disposed is formed between the inclined surface 513 and the rotor fixing portion 515 (refer to FIG. 9).

Subsequently, a portion where the protective member St3 of the bar St is sintered is polished to form the protective portion 52, and then the shaft 51 is completed. In addition, providing the concave portion described above enables a tool for performing polishing to be prevented from coming into contact with the rotor fixing portion 515. Accordingly, in the polishing step as a final step, powder generated by polishing a member to be formed into the core portion 510 can be prevented from adhering to an outer surface of the protective portion 52. This enables the protective portion 52 to be prevented from being shaved by polished powder of the core portion 510. In addition, wear between the core portion 510 and the sleeve 53 due to adhesion of the polished powder is suppressed.

The concave portion 514 (second cut portion St2) is formed in the shaft 51, so that when the protective member St3 forming the protective portion 52 is applied in the step of forming the protective portion 52, the protective member St3 is likely to accumulate in the second cut portion St2 in a concave shape. This facilitates forming the protective portion 52 and the first protective portion 521. In addition, the protective member St3 accumulates in the concave portion 514 (the second cut portion St2), so that the protective member St3 can be prevented from flowing down from the shaft 51 (the bar St), and thus the protective portion 52 (the protective member St3) can be stably formed.

Even in the shaft 51 including the inclined surface 513 with an axial end inclined toward the central axis Cx in an end portion of the outer peripheral surface 5110 of the bearing portion 511, the protective member St3 forming the protective portion 52 is likely to accumulate in the concave portion 514 (second cut portion St2), and thus forming the first protective portion 521 is facilitated. In addition, the protective member St3 accumulates in the concave portion 514 (second cut portion St2). Accordingly, the protective member St3 can be prevented from flowing down from the shaft 51 (the bar St) to facilitate manufacturing of the protective portion 52.

The concave portion 514 is disposed between the inclined surface 513 and the cylindrical surface 512, so that a radial end edge of the first protective portion 521 inclines toward the central axis Cx. This enables the shaft 51 to have a polishing surface to be polished in only the protective portion 52. Accordingly, accuracy in polishing of the polishing surface can be improved. In addition, the core portion 510 is not polished, so that polished powder does not contain polished powder of the core portion 510. For this reason, friction and wear between the shaft 51 and the sleeve 53 when the gas dynamic bearing 5 rotates are suppressed.

Operation of the blower apparatus A manufactured as described above will be described. When an electric current is supplied to the coil 213 of the motor 20, a circumferential force is generated on the rotor 22. Accordingly, the rotor 22 rotates about the shaft 51. Then, the blower apparatus A generates an airflow from upward to downward in the wind-tunnel portion 11. Thus, the rotation direction Rt of the rotor 22 and the shaft 51 is counterclockwise as viewed from above in the axial direction (refer to FIGS. 3 and 4, etc.).

When the shaft 51 rotates, an airflow is generated along the outer surface of the shaft 51. The airflow is generated along the outer surface of the shaft 51 in the same direction as the rotation direction Rt of the shaft 51. The gas dynamic bearing 5 includes the gas compressing portion 533 in each of the upper and lower dynamic pressure generating portions 501 in the axial direction. The airflow generated along the outer surface of the shaft 51 flows into the dynamic pressure groove 534 of the gas compressing portion 533 in the dynamic pressure generating portion 501, and flows along the dynamic pressure groove 534. The dynamic pressure groove 534 located forward in the rotation direction Rt of the shaft 51 is oriented toward the dynamic pressure holding portion 502. Thus, the airflow flowing along the dynamic pressure groove 534 flows toward and into the dynamic pressure holding portion 502.

In other words, when the shaft 51 is rotated to force the airflow to flow from the dynamic pressure generating portion 501 to the dynamic pressure holding portion 502, gas (air) pressure in the dynamic pressure holding portion 502 increases. The shaft 51 is rotated while being separated (floated) from the sleeve 53 due to gas pressure in the dynamic pressure holding portion 502. That is, when gas (air) is fed toward the dynamic pressure holding portion 502 from the dynamic pressure generating portion 501 in the gas dynamic bearing 5, pressure in the dynamic pressure holding portion 502 is increased, and then the shaft 51 is supported by the dynamic pressure holding portion 502 in a noncontact manner.

As described above, the gas dynamic bearing 5 generates dynamic pressure in the dynamic pressure generating portion 501 using rotation of the shaft 51 to increase pressure of gas (air) in the dynamic pressure holding portion 502, thereby supporting the shaft 51. Thus, when it is difficult to generate sufficient dynamic pressure to support the shaft 51, the shaft 51 may be inclined with respect to the central axis Cx. When inclination increases, the shaft 51 and the sleeve 53 come into contact with each other. For example, when the rotation is stopped, the shaft 51 comes into contact with the sleeve 53. After that, when the rotation is started, the shaft 51 and the sleeve 53 are rubbed for a certain time.

The gas dynamic bearing 5 of the present example embodiment includes the protective portion 52 formed on the outer peripheral surface 5110 that is largest in diameter of the shaft 51 in the radial direction. In addition, the protective portion 52 includes the first protective portion 521 disposed at an axially upper end of the outer peripheral surface 5110 of the bearing portion 511, the axially upper end being likely to come into contact with the inner peripheral surface 531 of the sleeve 53 when the shaft 51 is stopped. When the protective portion 52 is disposed on the outer peripheral surface 5110, the protective portion 52 comes into contact with the sleeve 53 when the shaft 51 inclines during stop of the motor 20, for example. The protective portion 52 has a lower coefficient of friction than the core portion 510 of the shaft 51 and the sleeve 53. Accordingly, even when the protective portion 52 starts rotating in contact with the sleeve 53, friction between the protective portion 52 and the sleeve 53 is small, and thus wear is less likely to occur.

That is, the protective portion 52 is made of a material having a lower coefficient of friction than the sleeve 53. Accordingly, even when the shaft 51 and the sleeve 53 come into contact with each other, friction therebetween is small. The protective portion 52 is also softer than the sleeve 53, so that the protective portion 52 is likely to be scraped more than the sleeve 53. Even when the protective portion 52 is scraped, the shaft 51 and the sleeve 53 are less likely to come into direct contact with each other. In addition, when the shaft 51 inclines, the protective portion 52 comes into contact with the sleeve 53. Accordingly, the protective portion 52 serves as a cushioning member, so that the shaft 51 and the sleeve 53 are less likely to come into direct contact with each other.

From the above, friction and wear between the shaft 51 and the sleeve 53 are suppressed, so that the shaft 51 can be rotated stably. Even when the shaft 51 is repeatedly started and stopped, the shaft 51 can be stably rotated.

The gas dynamic bearing 5 of the present example embodiment includes the first protective portion 521 having a thickness in the radial direction larger than the second protective portion 522, the first protective portion 521 being disposed in a portion that is most likely to come into contact the inner peripheral surface 531 of the sleeve 53 when the shaft 51 inclines. When the shaft 51 inclines, the first protective portion 521 is scraped. Even when the first protective portion 521 is scraped by contact with the sleeve 53, the core portion 510 is less likely to come into direct contact with the sleeve 53 due to the first protective portion 521 having a larger thickness in the radial direction than the second protective portion 522. Thus, even when the shaft 51 is repeatedly started and stopped, the shaft 51 can be rotated stably.

The motor 20 includes the gas dynamic bearing 5 described above, and thus friction and wear between the shaft 51 and the sleeve 53 can be suppressed even when the motor 20 is repeatedly started and stopped. Accordingly, the motor 20 can stably and smoothly rotate even when it is repeatedly started and stopped.

As described above, the shaft 51 is stably supported by the sleeve 53 in a rotatable manner, so that the impeller 30 is rotated stably by rotation of the motor 20. Accordingly, an airflow can be generated stably in the wind-tunnel portion 11, and the blower apparatus A can discharge a stable airflow from the exhaust port 15.

While in the present example embodiment, the protective portion 52 is provided at its upper end with the first protective portion 521, the present disclosure is not limited to this. The protective portion 52 may be provided at its lower end with the first protective portion 521. The protective portion 52 also may be provided at each of its upper and lower ends with the first protective portion 521. That is, the first protective portion 521 is disposed at least above or below the second protective portion 522 in the axial direction.

Figure 10:
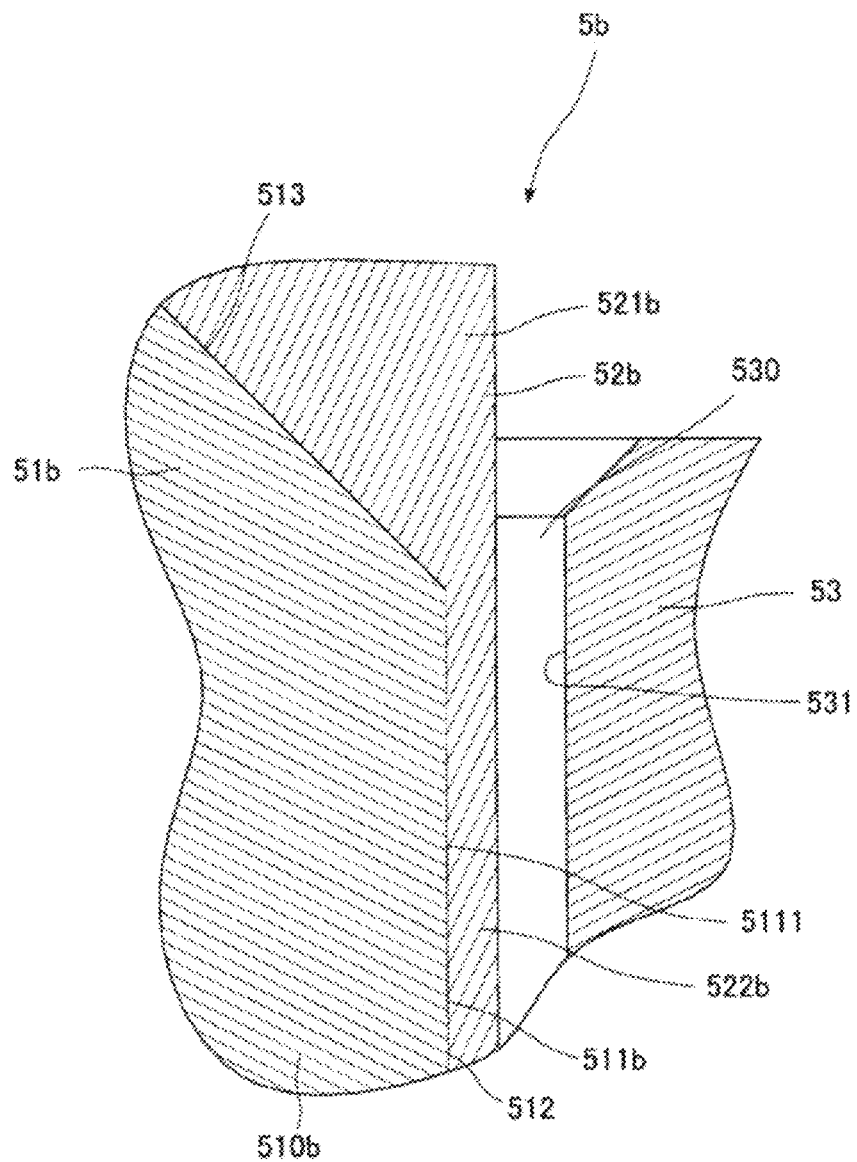
FIG. 10 is an enlarged sectional view of a first protective portion of a gas dynamic bearing according to an example embodiment of the present disclosure.

A first modification of the present example embodiment will be described with reference to the drawings. FIG. 10 is an enlarged cross-sectional view of a first protective portion 521b of a gas dynamic bearing 5b according to another example of the present disclosure. The gas dynamic bearing 5b illustrated in FIG. 10 has the same structure as the gas dynamic bearing 5 illustrated in FIG. 6, except that a shaft 51b and a protective portion 52b each have a different structure from that in the gas dynamic bearing 5. Thus, the gas dynamic bearing 5b is described such that substantially the same portion as that of the gas dynamic bearing 5 is denoted by the same reference numeral, and duplicated detailed description of the same portion is eliminated.

As illustrated in FIG. 10, the shaft 51b includes a bearing portion 511b having an outer peripheral surface 5111 that has a cylindrical surface 512 and an inclined surface 513. The cylindrical surface 512 and the inclined surface 513 are then connected in the axial direction.

Then, a protective portion 52b is disposed radially outside the outer peripheral surface 5111 of the bearing portion 511b. The protective portion 52b includes a first protective portion 521b disposed radially outside the inclined surface 513, and a second protective portion 522b disposed radially outside the cylindrical surface 512.

That is, the outer peripheral surface 5111 includes the cylindrical surface 512 of a core portion 510b, having a constant outer diameter, and the inclined surface 513 disposed on at least above or below the cylindrical surface 512, inclining toward the central axis Cx as extending toward an axial end of the core portion 510b. The first protective portion 521b is disposed radially outside the inclined surface 513.

The gas dynamic bearing 5b is formed without a concave portion 514, so that manufacturing of the shaft 51b is easy. Specifically, the number of steps for forming the concave portion 514 can be reduced, so that the number of work steps is reduced.

Figure 11:
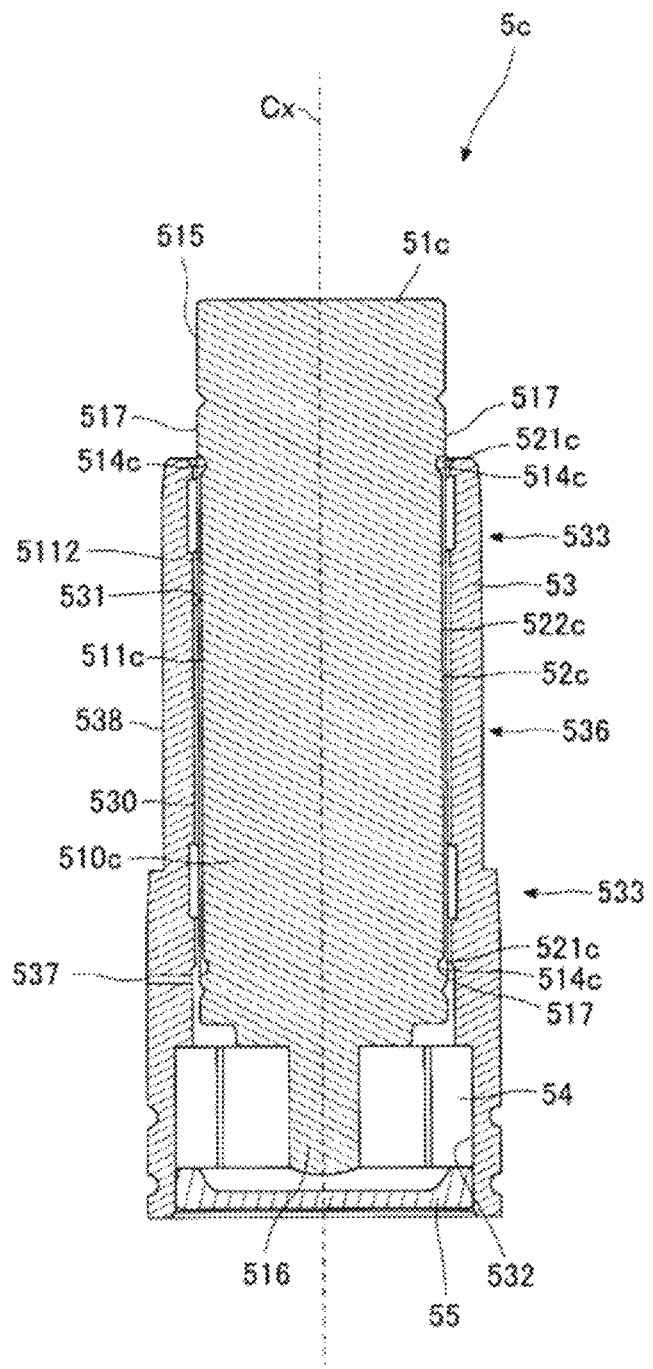
FIG. 11 is a longitudinal sectional view of a gas dynamic bearing according to an example embodiment of the present disclosure.
Figure 12:
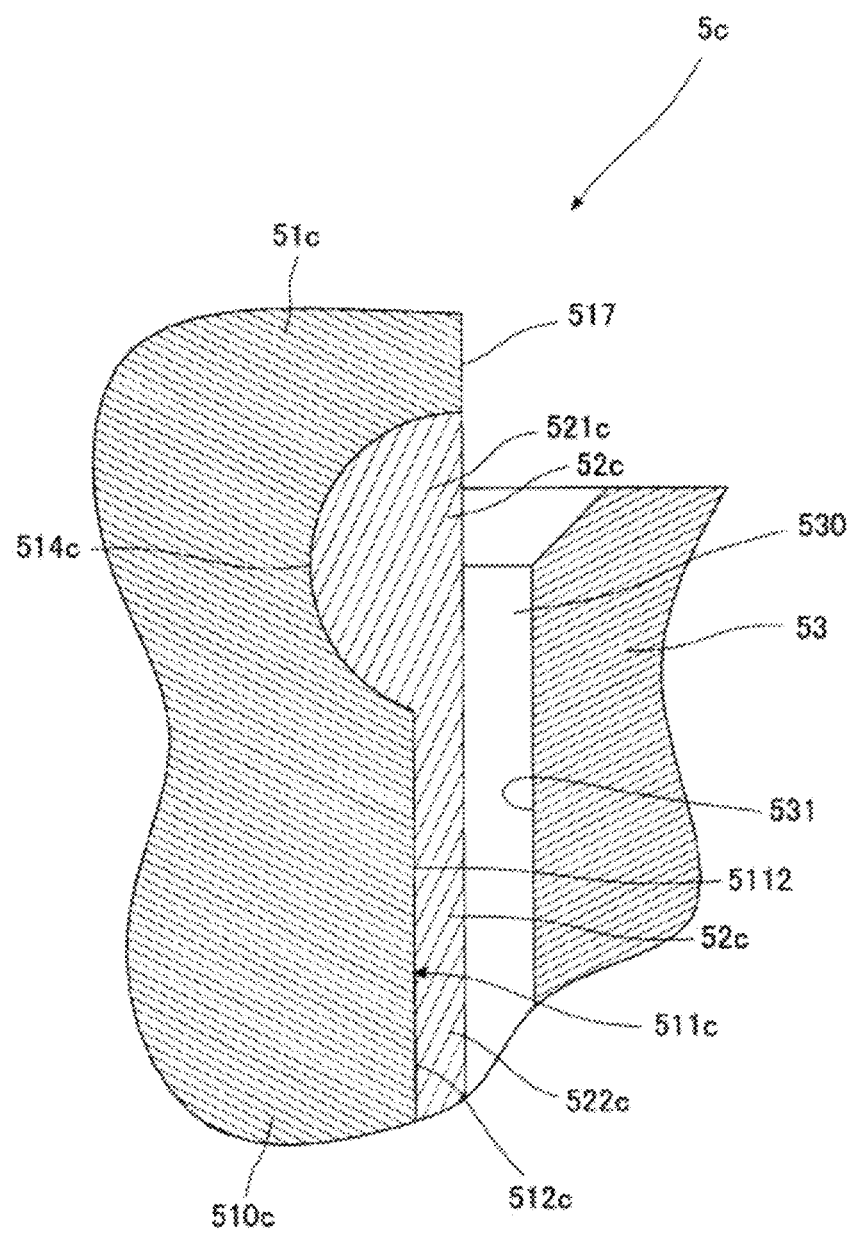
FIG. 12 is an enlarged cross-sectional view of a first protective portion of a gas dynamic bearing according to an example embodiment of the present disclosure.

A second modification of the present example embodiment will be described with reference to the drawings. FIG. 11 is a longitudinal sectional view of a gas dynamic bearing 5c according to the present disclosure. FIG. 12 is an enlarged cross-sectional view of a first protective portion 521c of the gas dynamic bearing 5c according to the present disclosure. The gas dynamic bearing 5c illustrated in FIGS. 11 and 12 has the same structure as the gas dynamic bearing 5 illustrated in FIG. 6, except that a shaft 51c and a protective portion 52c each have a different structure from that in the gas dynamic bearing 5. Thus, the gas dynamic bearing 5c is described such that substantially the same portion as that of the gas dynamic bearing 5 is denoted by the same reference numeral, and duplicated detailed description of the same portion is eliminated.

The gas dynamic bearing 5c illustrated in FIGS. 11 and 12 include the shaft 51c having a longer axial length than a sleeve 53, and the shaft 51c includes a bearing portion 511c that partly projects outward from an opening of a hole 530 at an upper end of the sleeve 53. The bearing portion 511c includes an outer peripheral surface 5112 that has a cylindrical surface 512c having a uniform outer diameter in the axial direction, and that has a concave portion 514c disposed at each of axial ends of the cylindrical surface 512c.

The protective portion 52c is disposed radially outside the cylindrical surface 512c and inside the concave portion 514c. The protective portion 52c includes the first protective portion 521c disposed inside the concave portion 514c, and a second protective portion 522c covering the cylindrical surface 512c from radially outward.

The shaft 51c includes edge portions 517 formed axially above and below the protective portion 52c of the core portion 510c. In the present example embodiment, each edge portion 517 has a cylindrical columnar shape. However, each edge portion 517 is not limited to the cylindrical columnar shape, and a shape that does not hinder rotation of the shaft 51c can be widely used. Each edge portion 517 is formed closer to an end of the core portion 510c than the first protective portion 521c of the protective portion 52. That is, the core portion 510c includes each edge portion 517 formed closer to the end of the core portion 510c than the first protective portion 521c. Then, each edge portion 517 is in contact with the first protective portion 521c in the axial direction.

The shaft 51c includes the first protective portion 521c formed at its intermediate portion in the axial direction. The first protective portion 521c is formed at a position on the shaft 51c, the position including a position with which an edge of the opening of the hole 530 of the sleeve 53 comes into contact when the shaft 51c inclines. When the first protective portion 521c is formed at an intermediate portion in the axial direction of the shaft 51c, the shaft 51c can be formed with a portion in the first protective portion 521c, the portion coming into contact with a sharp portion such as an edge of an opening of the sleeve 53. Accordingly, friction and wear between the shaft 51c and the sleeve 53 can be suppressed. This enables the sleeve 53 to stably support the shaft 51c in a rotatable manner.

The edge portion 517 has an outer diameter larger than an outer diameter of an outer peripheral surface of the bearing portion 511c. The outer diameter of the edge portion 517 is equal to an outermost diameter of the first protective portion 521c. That is, a portion of the edge portion 517, having the outermost diameter, has a radius equal to a distance between a portion of the first protective portion 521c, farthest from the central axis Cx in the radial direction, and the central axis Cx.

The outermost diameter of the first protective portion 521c is equal to an outermost diameter of the second protective portion 522c. That is, the shaft 51c includes the edge portion 517, the first protective portion 521c, and the second protective portion 522c, each having a radially outer surface constituting a cylindrical surface having a uniform outer diameter. In other words, a distance between a portion of the first protective portion 521c, farthest from the central axis Cx in the radial direction, and the central axis Cx, is equal to a distance between a portion of the second protective portion 522c, farthest from the central axis Cx in the radial direction, and the central axis Cx. As long as a boundary between the edge portion 517 and the first protective portion 521c and a boundary between the first protective portion 521c and the second protective portion 522c are smoothly continuous, the edge portion 517, the first protective portion 521c, and the second protective portion 522c each may have a radially outer surface that does not constitute a cylindrical surface having a uniform outer diameter.

The boundary between the edge portion 517 and the first protective portion 521c is smoothly continuous, so that an airflow flowing along the outer peripheral surface 5112 of the shaft 51c is less likely to be turbulent when flowing from a radially outer surface of the edge portion 517 to a radial outer surface of the first protective portion 521c. Accordingly, variation in gas pressure in the dynamic pressure holding portion 502 is suppressed, so that the shaft 51c can be stably rotated.

More specifically, at least one of the first protective portion 521c and the second protective portion 522c may have a gap in the circumferential direction. In this case, a distance between a portion of the first protective portion 521c, farthest from the central axis Cx in the radial direction, and the central axis Cx, is equal to an outer diameter of the edge portion 517. In addition, the distance between the portion of the first protective portion 521c, farthest from the central axis Cx in the radial direction, and the central axis Cx, is equal to a distance between a portion of the second protective portion 522c, farthest from the central axis Cx in the radial direction, and the central axis Cx.

A step is less likely to be formed at the boundary between the first protective portion 521c and the second protective portion 522c, so that an airflow flowing along the outer peripheral surface 5112 of the shaft 51c is less likely to be turbulent when flowing from a radially outer surface of the first protective portion 521c to a radially outer surface of the second protective portion 522c. Accordingly, variation in gas pressure in the dynamic pressure holding portion 502 is suppressed, so that the shaft 51c can be stably rotated. In addition, when at least one of the first protective portion 521c and the second protective portion 522c has a gap in the circumferential direction, material forming the protective portion 52c can be reduced in amount, and thus manufacturing cost can be reduced. Further, the shaft 51c can be reduced in weight, and energy saving can be achieved.

Providing the edge portion 517 allows a material forming the protective portion 52c to be pressed against an end of the edge portion 517 when the material forming the protective portion 52c disposed outside the core portion 510c is biased toward the edge portion. The material forming the protective portion 52c is pressed against the end of the edge portion 517, so that the material is less likely to flow axially outward from the edge portion.

In the protective portion 52c of the present modification, the first protective portion 521c can be easily changed in axial position in the shaft 51c. Accordingly, a position of the first protective portion 521c can be adjusted in accordance with a length of the shaft 51c. When the edge portion 517 is connected to the concave portion 514c, the material of the protective portion can be formed radially thick. Thus, the first protective portion 521c thicker in the radial direction than the second protective portion 522c can be more reliably formed.

Figure 13:
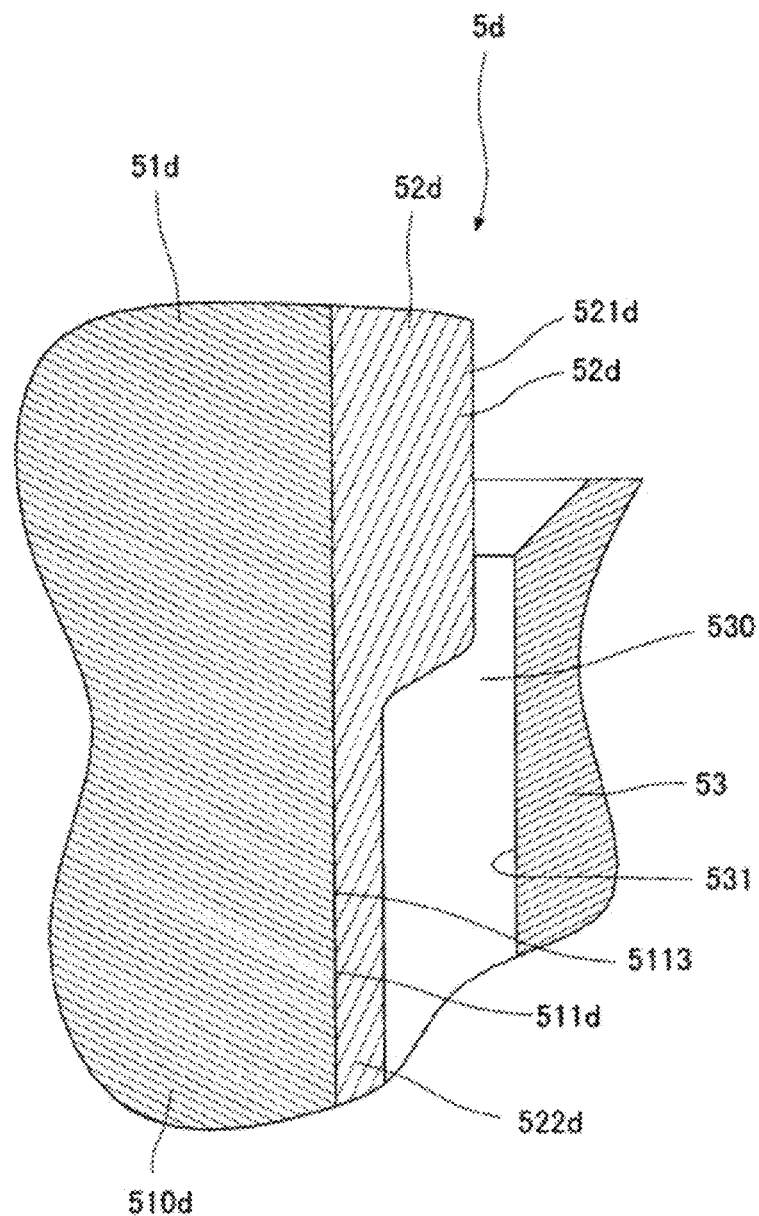
FIG. 13 is an enlarged sectional view of a first protective portion of a gas dynamic bearing according to an example embodiment of the present disclosure.

A third modification of the present example embodiment will be described with reference to the drawings. FIG. 13 is an enlarged cross-sectional view of a first protective portion 521d of a gas dynamic bearing 5d according to the present disclosure. The gas dynamic bearing 5d illustrated in FIG.

13 has the same structure as the gas dynamic bearing 5 illustrated in FIG. 6, except that a shaft 51d and a protective portion 52d each have a different structure from that in the gas dynamic bearing 5. Thus, the gas dynamic bearing 5d is described such that substantially the same portion as that of the gas dynamic bearing 5 is denoted by the same reference numeral, and duplicated detailed description of the same portion is eliminated.

As illustrated in FIG. 13, the gas dynamic bearing 5d includes a protective portion 52d disposed on an outer peripheral surface 5113 of a bearing portion 511d of the shaft 51d. The outer peripheral surface 5113 of the bearing portion 511d is uniform in outer diameter in the axial direction. The term "uniform in outer diameter" includes not only completely uniform, but also a variation to such an extent that rotation of the shaft 51d does not cause operation of the gas dynamic bearing 5d to be unstable.

The protective portion 52d includes the first protective portion 521d more protruding radially outward than a second protective portion 522d. Providing the protective portion 52d allows the first protective portion 521d to come into contact with an edge of an opening of a sleeve 53 when the shaft 51d inclines. This suppresses friction and wear due to direct contact between the core portion 510d of the shaft 51d and the sleeve 53.

While the example embodiments of the present disclosure are described above, various modifications and combinations of the example embodiments are available within the scope of the spirit of the present disclosure.

The present disclosure is available for a blower apparatus that blows cooling air to an electronic device, for example.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A gas dynamic bearing comprising:
a shaft disposed along a central axis extending in a vertical direction; and
a sleeve provided with a hole opening at least at one end of the sleeve in an axial direction;
at least a portion of the shaft being housed inside the hole;
the sleeve including a plurality of dynamic pressure grooves in an inner peripheral surface of the hole;
the shaft including:
a core portion; and
a protective portion that is disposed on an outer peripheral surface of the core portion and that includes at least a portion facing the inner peripheral surface of the hole in the radial direction;
the protective portion including:
a first protective portion; and
a second protective portion;
the first protective portion being disposed at least above or below the second protective portion in the axial direction, and including at least a portion with a thickness in the radial direction more than a thickness of the second protective portion in the radial direction;
the outer peripheral portion including:
a recessed portion recessed in the radial direction;
a cylindrical surface of the core portion, with a constant outer diameter; and
an inclined surface disposed at least above or below the cylindrical surface, inclining toward the central axis as extending toward an end of the core portion;
the first protective portion is disposed in the recessed portion; and
the recessed portion connects the cylindrical surface and the inclined surface in the axial direction.

2. The gas dynamic bearing according to claim 1, wherein the first protective portion includes a protective inclined surface continuous with the inclined surface; and
the protective inclined surface is connected to the inclined surface.

3. The gas dynamic bearing according to claim 1, wherein a distance between a portion of the first protective portion, farthest from the central axis in the radial direction, and the central axis, is equal to a distance between a portion of the second protective portion, farthest from the central axis in the radial direction, and the central axis.

4. A motor comprising:
the gas dynamic bearing according to claim 1;
a stator disposed on an outer surface of the sleeve; and
a rotor fixed to an upper end of the shaft while radially facing the stator; wherein
the first protective portion is at an upper end of the outer peripheral surface in the axial direction.

5. A blower apparatus comprising:
the motor according to claim 4; and
an impeller attached to the rotor.

6. A gas dynamic bearing comprising:
a shaft disposed along a central axis extending in a vertical direction; and
a sleeve provided with a hole opening at least at one end of the sleeve in an axial direction;
at least a portion of the shaft being housed inside the hole;
the sleeve including a plurality of dynamic pressure grooves in an inner peripheral surface of the hole;
the shaft including:
a core portion; and
a protective portion that is disposed on an outer peripheral surface of the core portion and that includes at least a portion facing the inner peripheral surface of the hole in the radial direction;
the protective portion including:
a first protective portion; and
a second protective portion;
the first protective portion being disposed at least above or below the second protective portion in the axial direction, and including at least a portion with a thickness in the radial direction more than a thickness of the second protective portion in the radial direction; and
the core portion includes an edge portion closer to an end of the core portion than the first protective portion;
the edge portion is in contact with the first protective portion in the axial direction; and
the edge portion has an outer diameter larger than an outer diameter of the outer peripheral surface.

7. The gas dynamic bearing according to claim 6, wherein a portion of the edge portion, having the outermost diameter, has a radius equal to a distance between a portion of the first protective portion, farthest from the central axis in the radial direction, and the central axis.

8. The gas dynamic bearing according to claim 6, wherein a distance between a portion of the first protective portion, farthest from the central axis in the radial direction, and the central axis, is equal to a distance between a portion of the second protective portion, farthest from the central axis in the radial direction, and the central axis.

9. A motor comprising:
the gas dynamic bearing according to claim 6;
a stator disposed on an outer surface of the sleeve; and
a rotor fixed to an upper end of the shaft while radially facing the stator; wherein the first protective portion is at an upper end of the outer peripheral surface in the axial direction.

10. A blower apparatus comprising:
the motor according to claim 9; and
an impeller attached to the rotor.

11. A gas dynamic bearing comprising:
a shaft disposed along a central axis extending in a vertical direction; and
a sleeve provided with a hole opening at least at one end of the sleeve in an axial direction;
at least a portion of the shaft being housed inside the hole;
the sleeve including a plurality of dynamic pressure grooves in an inner peripheral surface of the hole;
the shaft including:
a core portion; and
a protective portion that is disposed on an outer peripheral surface of the core portion and that includes at least a portion facing the inner peripheral surface of the hole in the radial direction;
the protective portion including:
a first protective portion; and
a second protective portion;
the first protective portion being disposed at least above or below the second protective portion in the axial direction, and including at least a portion with a thickness in the radial direction more than a thickness of the second protective portion in the radial direction; and
a portion of the edge portion, having the outermost diameter, has a radius equal to a distance between a portion of the first protective portion, farthest from the central axis in the radial direction, and the central axis.

12. The gas dynamic bearing according to claim 11, wherein the outer peripheral surface includes a recessed portion recessed in the radial direction; and
the first protective portion is disposed in the recessed portion.

13. The gas dynamic bearing according to claim 12, wherein the outer peripheral surface includes a cylindrical surface of the core portion, with a constant outer diameter, and an inclined surface disposed on at least above or below the cylindrical surface, inclining toward the central axis as extending toward an end of the core portion; and
the recessed portion connects the cylindrical surface and the inclined surface in the axial direction.

14. The gas dynamic bearing according to claim 13, wherein the first protective portion includes a protective inclined surface continuous with the inclined surface; and
the protective inclined surface is connected to the inclined surface.

15. The gas dynamic bearing according to claim 11, wherein the outer peripheral surface includes a cylindrical surface of the core portion, with a constant outer diameter in the axial direction, and an inclined surface disposed on at least above or below the cylindrical surface, inclining toward the central axis
and extending toward an axial end of the core portion; and
the first protective portion is disposed on the inclined surface.

16. The gas dynamic bearing according to claim 11, wherein the core portion includes an edge portion closer to an end of the core portion than the first protective portion;
the edge portion is in contact with the first protective portion in the axial direction; and
the edge portion has an outer diameter larger than an outer diameter of the outer peripheral surface.

17. The gas dynamic bearing according to claim 16, wherein a portion of the edge portion, having the outermost diameter, has a radius equal to a distance between a portion of the first protective portion, farthest from the central axis in the radial direction, and the central axis.

18. A motor comprising:
the gas dynamic bearing according to claim 11;
a stator disposed on an outer surface of the sleeve; and
a rotor fixed to an upper end of the shaft while radially facing the stator; wherein
the first protective portion is at an upper end of the outer peripheral surface in the axial direction.

19. A blower apparatus comprising:
the motor according to claim 18; and
an impeller attached to the rotor.

* * * * *